(12) United States Patent
Oh et al.

(10) Patent No.: US 9,392,203 B2
(45) Date of Patent: Jul. 12, 2016

(54) IMAGE SENSOR AND METHOD OF CORRECTION OUTPUT SIGNAL OF THE IMAGE SENSOR

(71) Applicant: SAMSUNG ELECTRONICS CO., LTD., Suwon-si, Gyeonggi-do (KR)

(72) Inventors: Min-Seok Oh, Gyeonggi-do (KR);
Seung-Sik Kim, Hwaseong-si (KR);
Young-Chan Kim, Seongnam-si (KR);
Tae-Han Kim, Suwon-si (KR);
Eun-Sub Shim, Anyang-si (KR);
Dong-Joo Yang, Seongnam-si (KR);
Moo-Sub Lim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 24 days.

(21) Appl. No.: 14/499,658

(22) Filed: Sep. 29, 2014

(65) Prior Publication Data
US 2015/0208009 A1    Jul. 23, 2015

(30) Foreign Application Priority Data

Jan. 21, 2014 (KR) .................. 10-2014-0007397

(51) Int. Cl.
*H04N 5/361* (2011.01)
*H04N 5/378* (2011.01)
*H04N 5/3745* (2011.01)

(52) U.S. Cl.
CPC ............. *H04N 5/378* (2013.01); *H04N 5/361* (2013.01); *H04N 5/3745* (2013.01)

(58) Field of Classification Search
CPC ........ H04N 5/378; H04N 5/361; H04N 5/3745
See application file for complete search history.

(56) References Cited

U.S. PATENT DOCUMENTS

| 8,018,505 | B2 | 9/2011 | Suzuki |
| 2003/0202111 | A1 | 10/2003 | Park |
| 2008/0218615 | A1* | 9/2008 | Huang ................. H04N 5/2176 348/294 |
| 2010/0045827 | A1 | 2/2010 | Uchida et al. |
| 2012/0262622 | A1 | 10/2012 | Kim et al. |
| 2013/0113967 | A1 | 5/2013 | Wang |
| 2013/0164877 | A1 | 6/2013 | Anderson et al. |
| 2015/0281603 | A1* | 10/2015 | Kim ..................... H04N 5/3575 348/308 |

FOREIGN PATENT DOCUMENTS

KR    10-2012-0118348 A    10/2012

* cited by examiner

*Primary Examiner* — Tuan Ho
(74) *Attorney, Agent, or Firm* — Lee & Morse, P.C.

(57) ABSTRACT

A pixel array includes an array of pixels to receive light, a first pixel to be blocked from receiving the light, and a circuit to adjust signals output from pixels in the array based on a signal from the first pixel. The signals output from the pixels in the array include a first error value. The circuit reduces the first error value in the signals from the pixels in the array based on the signal from the first pixel. The circuit may also reduce a second error value in the signals output from the pixels in the array based on a signal from a second pixel. The first and second pixels may be outside of the pixel array. The first and second error values may be storage diode leakage value and a dark current value.

15 Claims, 11 Drawing Sheets

TOP ROW CORRECTION

IMAGE SENSOR AND METHOD OF CORRECTION OUTPUT SIGNAL OF THE IMAGE SENSOR

CROSS-REFERENCE TO RELATED APPLICATION

Korean Patent Application No. 10-2014-0007397, filed on Jan. 21, 2014, and entitled, "Image Sensor and Method of Correcting Output Signal of the Image Sensor," is incorporated by reference herein in its entirety.

BACKGROUND

1. Field

One or more embodiments described herein relate to an image sensor and a method of correcting output signals of the image sensor.

2. Description of Related Art

An image sensor may be mounted in the camera of a mobile phone, in a digital still camera, or another electronic device. In operation, the image sensor captures images and converts them into electrical signals, e.g., transmittable digital image signals. The digital image signals may include image data having three colors, e.g., red, green, and blue. Signal processing is performed on the digital image signals to drive a display device. The image sensor may be a CMOS image sensor and the display device may be a liquid crystal display.

SUMMARY

In accordance with one embodiment, an image sensor includes a row driver configured to generate a storage control signal, a transfer control signal, a reset control signal, and a row selecting signal; a pixel array including an optical black sample array adjacent to an active array, the pixel array configured to receive optical signals and convert the optical signals to electric signals and configured to output the electric signals as image signals in response to the storage control signal, the transfer control signal, the reset control signal, and the row selecting signal; an analog-to-digital converter configured to perform an analog-to-digital conversion on the image signals to generate first signals; and an output correcting circuit configured to compare values of signals output from the active array with values of signals output from the optical black sample array, and configured to correct the signals output from the active array to generate second signals based on the comparison. The optical black sample array may be configured to be fully shielded from light.

The signals output from the active array among the first signals may include signal components corresponding to optical signals and storage-diode leakage current components, and the signals output from the optical black sample array may include the storage-diode leakage current components without optical signal components.

The output correcting circuit may be configured to compare the values of signals output from the active array with the values of signals output from the optical black sample array, and to correct the signals output from the active array to reduce vertical shading.

The output correcting circuit may be configured to subtract the values of signals output from the active array among the first signals from the values of signals output from the optical black sample array, to reduce a vertical shading of signals output from the active array.

The output correcting circuit may be configured to compare values of signals output from rows of the active array with values of signals output from corresponding rows of the optical black sample array, to correct the signals output from the active array. The optical black sample array may be adjacent to a first side or a second side of the active cell array.

The optical black sample arrays may be adjacent to a first side and a second side of the active cell array, respectively. Signals output from a first portion of the active array may be configured to be corrected by signals output from the one of the optical black sample arrays, and signals output from a second portion of the active array may be configured to be corrected by signals output from the another one of the optical black sample arrays. The image sensor may include a buffer circuit configured to latch and amplify the second signals, to generate output signals.

In accordance with another embodiment, an image sensor includes a row driver configured to generate a storage control signal, a transfer control signal, a reset control signal, and a row selecting signal; a pixel array including an active array, a dummy array adjacent to the active array, and an optical black sample array adjacent to the dummy array, the pixel array configured to receive optical signals and convert the optical signals to electrical signals for output as image signals in response to the storage control signal, the transfer control signal, the reset control signal, and the row selecting signal; an analog-to-digital converter configured to perform an analog-to-digital conversion on the image signals to generate first signals; and an output correcting circuit configured to compare values of signals output from the active array among the first signals with values of signals output from the optical black sample array to correct dark currents of the signals output from the active array, to compare the values of signals output from the active array among the first signals with values of signals output from the dummy array to correct light leakages of the signals output from the active array, and to generate second signals.

Each of the pixels in the active array and the optical black sample array may include a photodiode having an anode connected to a reference voltage; a first MOS transistor having a first output terminal connected to a cathode of the photodiode, and a control terminal to receive the storage control signal; a storage diode having a cathode connected to a second output terminal of the first MOS transistor and an anode connected to the reference voltage; a second MOS transistor having a first output terminal connected to the second output terminal of the first MOS transistor, a control terminal to receive the transfer control signal, and a second output terminal connected to a floating diffusion node; a third MOS transistor having a first output terminal connected to the floating diffusion node, a second output terminal connected to a supply voltage, and a control terminal to receive the reset control signal; a fourth MOS transistor having a control terminal connected to the floating diffusion node and a first output terminal connected to the supply voltage; a fifth MOS transistor having a control terminal to receive the row selecting signal, a first output terminal connected to a second output terminal of the fourth MOS transistor, and a second output terminal from which the image signals are output; and a sixth MOS transistor having a first output terminal connected to a cathode of the photodiode, a second output terminal connected to the supply voltage, and a control terminal to receive an overflow control signal.

Each of the pixels included in the optical black sample array may include a storage diode having an anode connected to a reference voltage; a first MOS transistor having a first output terminal connected to a cathode of the storage diode, a control terminal to receive the transfer control signal, and a second output terminal connected to a floating diffusion node; a second MOS transistor having a first output terminal connected to the floating diffusion node, a second output terminal connected to a supply voltage, and a control terminal to receive the reset control signal; a third MOS transistor having a control terminal connected to the floating diffusion node and a first output terminal connected to the supply voltage; and a fourth MOS transistor having a control terminal to receive the row selecting signal, a first output terminal connected to a second output terminal of the third MOS transistor, and a second output terminal from which the image signals are output.

Each of the pixels included in the dummy array may include a photodiode having an anode connected to a reference voltage; a first MOS transistor having a first output terminal connected to a cathode of the photodiode and a control terminal to receive the storage control signal; a storage diode having a cathode connected to a second output terminal of the first MOS transistor and an anode connected to the reference voltage; a second MOS transistor having a first output terminal connected to the second output terminal of the first MOS transistor, a control terminal to receive the transfer control signal, and a second output terminal connected to a floating diffusion node; a third MOS transistor having a first output terminal connected to the floating diffusion node, a second output terminal connected to a supply voltage, and a control terminal to receive the reset control signal; a fourth MOS transistor having a control terminal connected to the floating diffusion node and a first output terminal connected to the supply voltage; a fifth MOS transistor having a control terminal to receive the row selecting signal, a first output terminal connected to a second output terminal of the fourth MOS transistor, and a second output terminal from which the image signals are output; and a sixth MOS transistor having a first output terminal connected to a cathode of the photodiode, a control terminal, and a second output terminal commonly connected to the supply voltage. The sixth MOS transistor may be configured to discharge charges generated at the cathode of the photodiode.

In accordance with another embodiment, an apparatus includes an array of pixels to receive light; a first pixel outside of the array; and a circuit to adjust signals output from pixels in the array based on a signal from the first pixel, wherein the signals output from the pixels in the array include a first error value and wherein the circuit reduces the first error value in the signals from the pixels in the array based on the signal from the first pixel. The first pixel may be blocked from receiving the light.

The pixel array may include a second pixel outside of the array, wherein the circuit is to reduce the first error value in a first number of pixels in a row of the array based on the signal from the first pixel and is to reduce the first error value in a second number of pixels in the row of the array based on a signal from the second pixel. The second pixel may be blocked from receiving the light. The first and second pixels may be aligned with the pixels in the first row of array.

The pixel array may include a second pixel between the first pixel and the array of pixels, wherein the circuit is to reduce a second error value in the signals output from the pixels in the array based on a signal output from the second pixel. The first error value may include a dark current value, and the second error value may include a storage diode leakage value.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
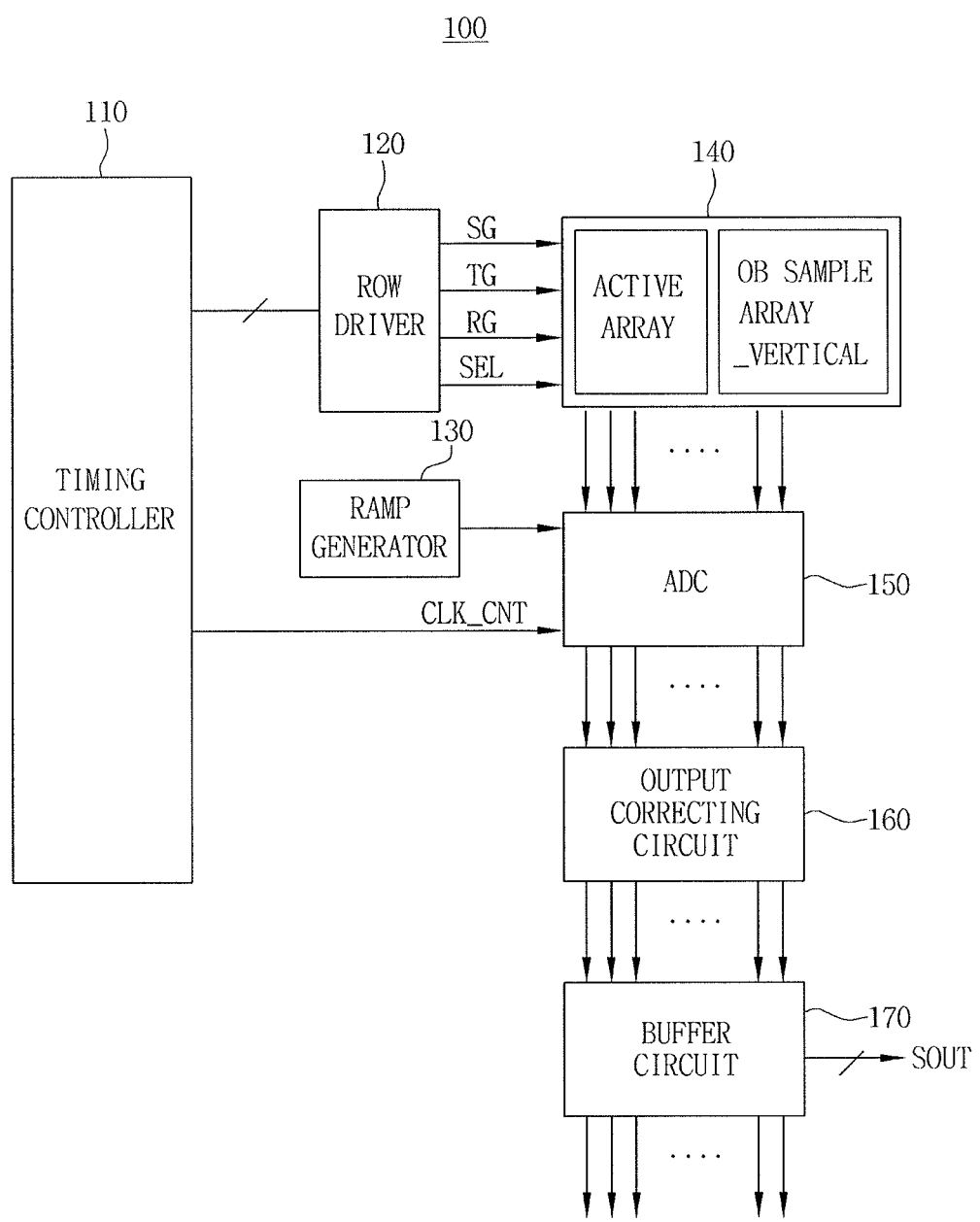
FIG. 1 illustrates an embodiment of an image sensor.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an image sensor 100 which includes a timing controller 110, a row driver 120, a ramp generator 130, a pixel array 140, an analog-to-digital converter (ADC) 150, an output correcting circuit 160, and a buffer circuit 170.

The timing controller 110 generates control signals to control operations of the row driver 120 and the ADC 150. The row driver 120 generates a storage control signal (SG), a transfer control signal (TG), a reset control signal (RG), and a row selecting signal (SEL) to control operation of the pixel array 140 based on the control signals from the timing controller 110. The pixel array 140 includes a plurality of pixels, which, for example, may include red pixels for converting a light of the red spectral region to electrical signals, green pixels for converting a light of the green spectral region to electrical signals, and blue pixels for converting a light of the blue spectral region to electrical signals.

The pixel array 140 includes an optical black (OB) sample array adjacent to an active array. The pixel array receives optical signals (e.g., light) and converts the optical signals to electrical signals. The electrical signals are output as image signals based on the storage control signal SG, the transfer control signal TG, the reset control signal RG, and the row selecting signal SEL.

The ramp signal generator 130 generates a ramp signal.

The analog-to-digital converter (ADC) 150 receives image signals in analog form from the pixel array 140 in response to the ramp signal and a clock signal CLK_CNT received from the timing controller 110. The ADC 150 performs analog-to-digital conversion on the image signals to generate first signals. The ADC 150 may convert the analog signals to digital signals using a correlated double sampling (CDS) method.

The output correcting circuit 160 corrects output signals from the active array by comparing the sizes of output signals from the active array among the first signals to the sizes of output signals from the OB sample array, to generate second signals. The buffer circuit 170 latches and amplifies output signals of the output correcting circuit 160 to generate sensor output signals SOUT.

Figure 2:
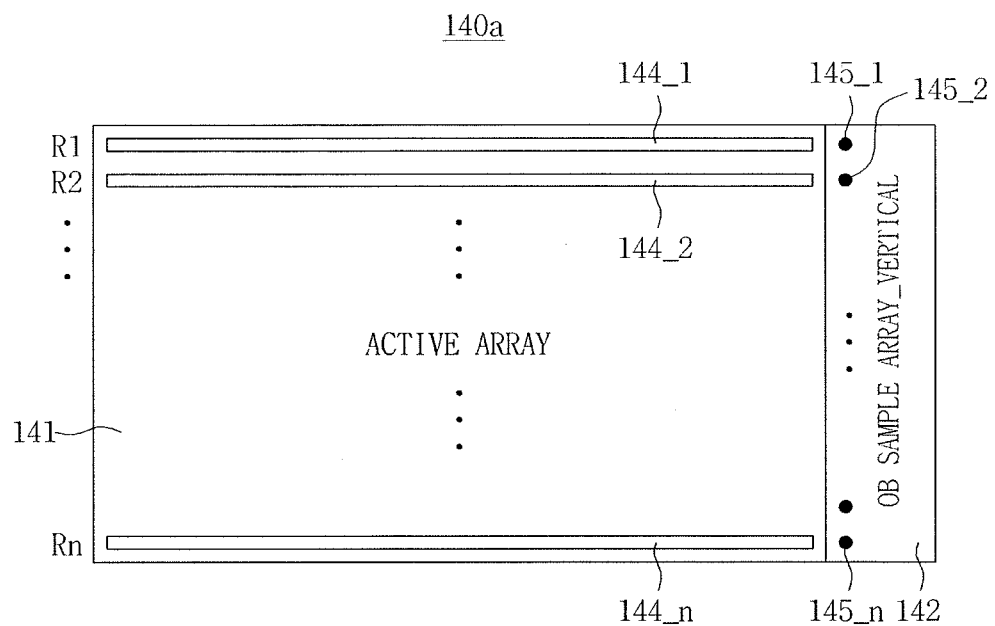
FIG. 2 illustrates an embodiment of a pixel array.

FIG. 2 illustrates an embodiment of a pixel array 140a, which, for example, may correspond to pixel array 140 in the image sensor of FIG. 1. Referring to FIG. 2, the pixel array 140a may include an OB sample array 142 adjacent to an active array 141. The pixel array 140a may include rows R1 to Rn. The active array 141 may include rows 144_1 to 144_n, and the OB sample array 142 may include pixels 145_1 to 145_n.

The image sensor 100 may compare values of signals output from the active array 141 with values of signals output from the OB sample array 142, and correct the signals output from the active array 141 based on the comparison. For example, signals output from the first row 144_1 of the active array 141 may be corrected, or compensated, using signals output from a pixel 145_1 of the OB sample array 142, disposed in the first row R1 of the pixel array 140a. Signals output from the second row 144_2 of the active array 141 may be corrected, or compensated, using signals output from a pixel 145_2 of the OB sample array 142, disposed in the second row R2 of the pixel array 140a.

Figure 3:
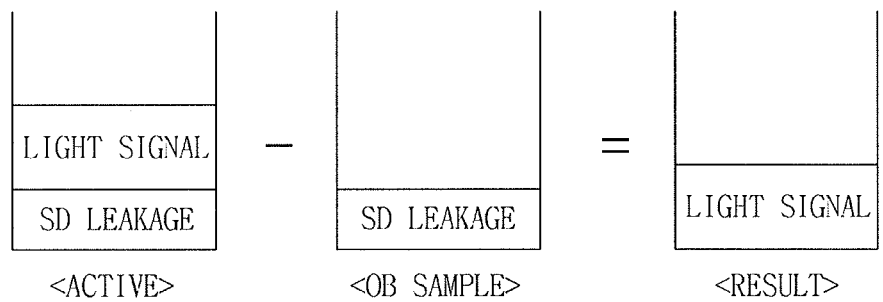
FIGS. 3 and 4 illustrate an embodiment of a process for correcting output signals of an image sensor.
Figure 4:
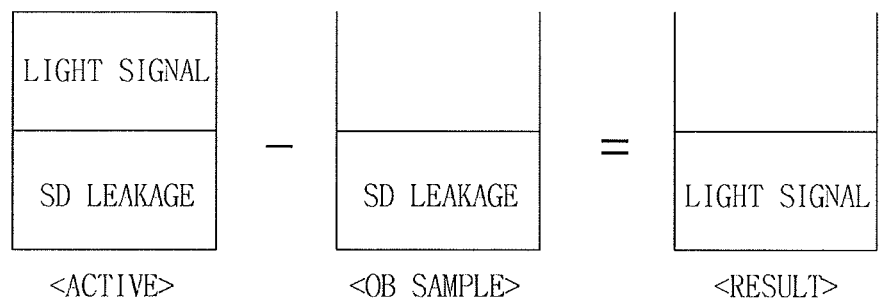

FIGS. 3 and 4 illustrate an embodiment of a process for correcting output signals of an image sensor having a pixel array, such as the pixel array 140a in FIG. 2.

Referring to FIGS. 3 and 4, output signals of the active array 141 that include a light signal LIGHT SIGNAL and a storage diode leakage current SD LEAKAGE may be compensated using output signals of the OB sample array 142 that include a storage diode leakage current SD LEAKAGE. The values of the storage diode leakage current SD LEAKAGE may increase from a top row to a bottom row. The image sensor 100 may reduce the storage diode leakage current SD LEAKAGE by subtracting the output signals of the OB sample array 142 from the output signals of the active array 141.

Figure 5:
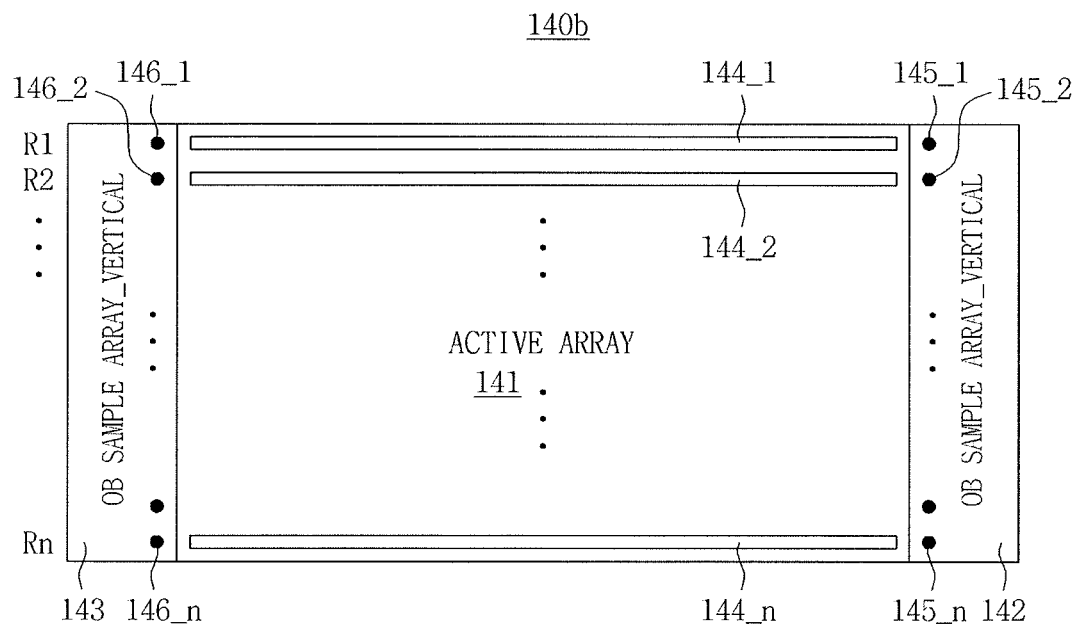
FIG. 5 illustrates another embodiment of a pixel array.

FIG. 5 illustrates another embodiment of a pixel array 140b, which, for example, may correspond to the pixel array in the image sensor in FIG. 1. Referring to FIG. 5, the pixel array 140b may include OB sample arrays 142 and 143 at right and left sides of the active array 141, respectively. The pixel array 140b may include rows R1 to Rn. The active array 141 may include rows 144_1 to 144_n. The OB sample array 142 adjacent to the right side of the active array 141 may include pixels 145_1 to 145_n. The OB sample array 143 adjacent to the left side of the active array 141 may include pixels 146_1 to 146_n.

The image sensor 100 may compare values of signals output from the active array 141 with values of signals output from the OB sample arrays 143 and 142, and may correct the signals output from the active array 141 based on the comparison. For example, signals output from the left-half portion of the first row 144_1 of the active array 141 may be corrected using signals output from a pixel 146_1 of the OB sample array 143 in the first row R1 of the pixel array 140b. Signals output from the right-half portion of the first row 144_1 of the active array 141 may be corrected using signals output from a pixel 145_1 of the OB sample array 142 in the first row R1 of the pixel array 140b.

Figure 6:
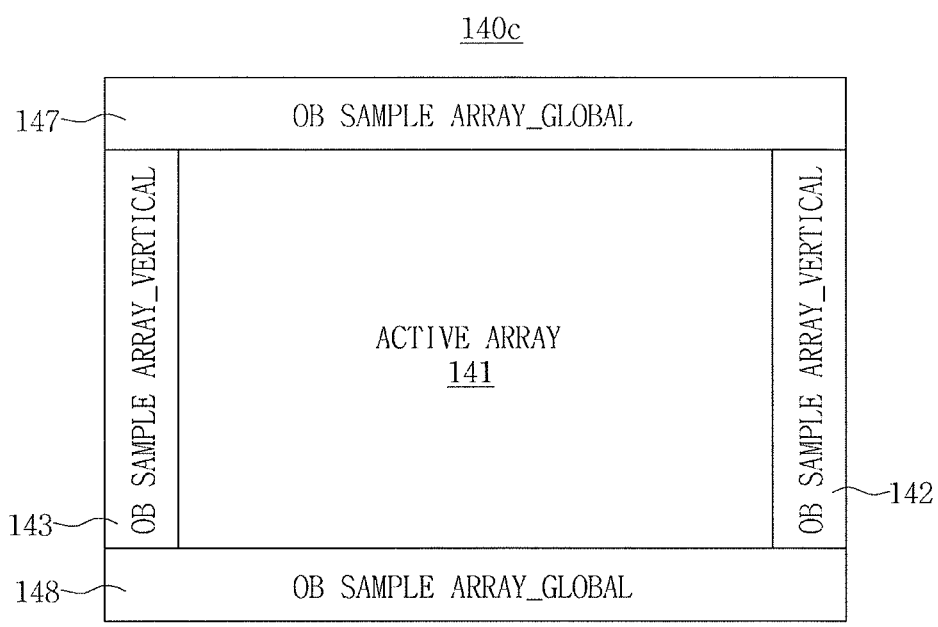
FIG. 6 illustrates another embodiment of a pixel array.

FIG. 6 illustrates another embodiment of a pixel array 140c, which, for example, may correspond to the pixel array in the image sensor of FIG. 1. Referring to FIG. 6, the pixel array 140c may include optical black sample arrays 143 and 142 adjacent to left and right sides of the active array 141, respectively, and OB sample arrays 147 and 148 adjacent to an upper side and lower side of the active array 141. The OB sample arrays 143 and 142 adjacent to a left and right sides of the active array 141 may be used to correct offsets of output signals in the vertical direction. The OB sample arrays 147 and 148 adjacent to upper and lower sides of the active array 141 may be used to correct offsets of output signals of all the pixels of the active array 141.

Figure 7:
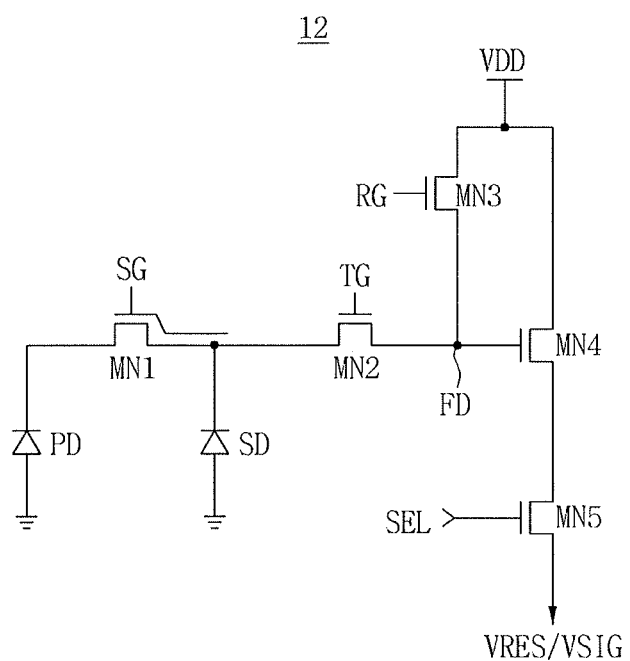
FIGS. 7 and 8 illustrate additional embodiments of a pixel driving circuit.
Figure 8:
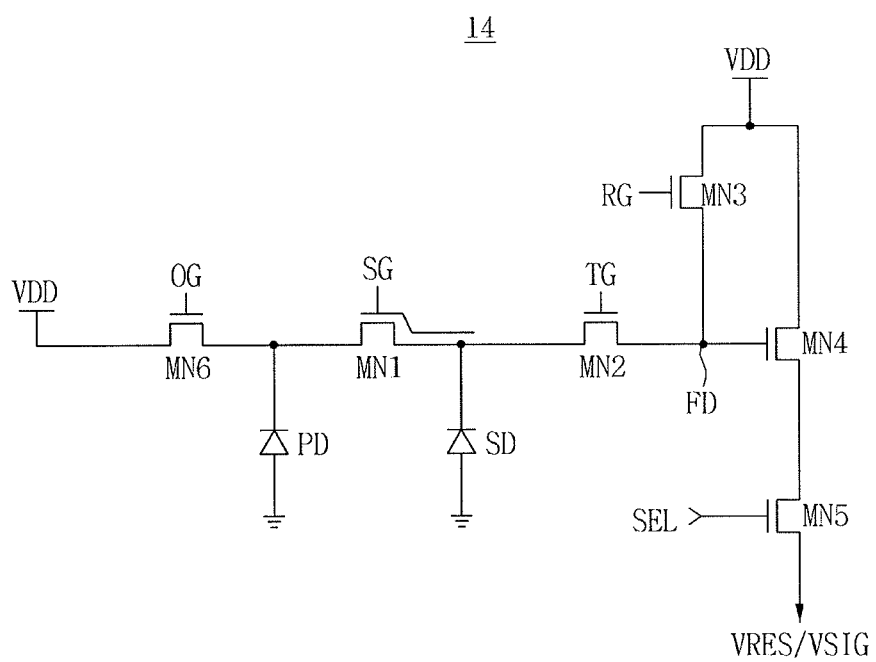

FIGS. 7 and 8 illustrate embodiments of pixel driving circuits for driving a unit pixel of a pixel array, which, for example, may be in the image sensor of FIG. 1.

Referring to FIG. 7, the pixel driving circuit 12 may include a photodiode PD, a storage diode SD, and NMOS transistors MN1, MN2, MN3, MN4, and MN5. The first NMOS transistor MN1 serves as a storage transistor and operates in response to the storage control signal SG to transfer charges generated from the photodiode PD to the storage diode SD. A cathode of the storage diode SD may be a storage region.

The second NMOS transistor MN2 serves as a transfer transistor and operates in response to the transfer control signal TG to transfer charges accumulated in the storage diode SD to a floating diffusion node FD.

The third NMOS transistor MN3 serves as a reset transistor and operates in response to the reset control signal RG to reset the floating diffusion node FD using a supply voltage VDD.

The fourth NMOS transistor MN4 serves as a driving transistor and operates in response to a voltage of the floating diffusion node FD to output electrical signals proportional to the amount of charge transferred from the storage diode SD to the floating diffusion node FD.

The fifth NMOS transistor MN5 serves as a selecting transistor and operates in response to the row selecting signal SEL to transmit an output signal of the fourth NMOS transistor MN4 to the ADC 150. The gate terminal of the first NMOS transistor MN1 may cover the surface of the storage diode SD in the semiconductor integrated circuit.

The pixel driving circuit 12 may operate in a rolling shutter mode or in a global shutter mode based on the states of control signals SG, TG, RG, and SEL. In the rolling shutter mode, signals photoelectrically converted by the photodiode PD of each row in one frame are selected in order and transferred to the floating diffusion node FD. Corresponding image signals are then output. In the global shutter mode, all signals photoelectrically converted by all the photodiode PD are transferred to the floating diffusion node FD at one time. Corresponding image signals are then output in order from a selected row.

In operation, a signal of the floating diffusion node FD transferred from the supply voltage VDD is output as a reset signal VRES when the reset control signal RG is enabled in a pixel selected by the row selecting signal SEL. This may occurs when the pixel driving circuit 12 operates in the rolling shutter mode or in the global shutter mode. When the transfer control signal TG is enabled, a signal transferred from the photodiode PD to the floating diffusion node FD is output as an image signal VSIG.

In the rolling shutter mode, the image signal VSIG may be output after the reset signal VRES is output. However, in the global shutter mode, the image signal VSIG may be output before the reset signal VRES is output.

When the analog-to-digital conversion is performed using a CDS method, the ADC 150 may convert the image signal VSIG in analog form to a digital signal based on a difference between the image signal VSIG and the reset signal VRES. The control signals SG, TG, RG, and SEL applied to the pixel driving circuit 12 may be generated by the row driver 120 in FIG. 1.

Referring to FIG. 8, a pixel driving circuit 14 may include a photodiode PD, a storage diode SD and NMOS transistors MN1, MN2, MN3, MN4, MN5, and MN6. The pixel driving circuit 14, therefore, has a configuration in which the NMOS transistor MN6 is included in the pixel driving circuit 12 of FIG. 7. The NMOS transistor MN6 operates in response to an overflow control signal OG, and may function to prevent charge in the photodiode region (e.g., a cathode of the photodiode PD) from overflowing. The pixel driving circuit 14 may operate in a manner similar to the pixel driving circuit 12 of FIG. 7.

Figure 9:
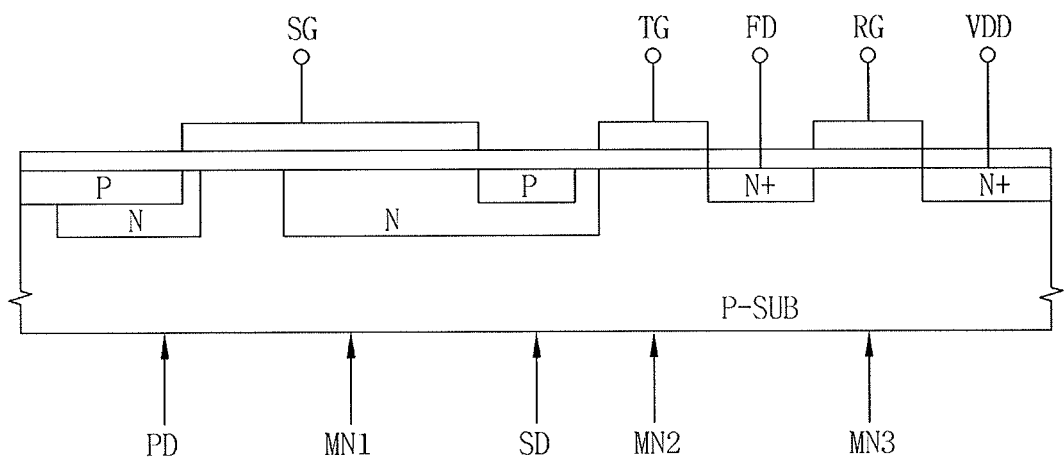
FIG. 9 illustrates an integrated circuit including the pixel driving circuit.

FIG. 9 illustrates an embodiment of an integrated circuit for the pixel driving circuit of FIG. 7. The integrated circuit includes the photodiode PD, the storage diode SD, and NMOS transistors MN1, MN2, and MN3.

Figure 10:
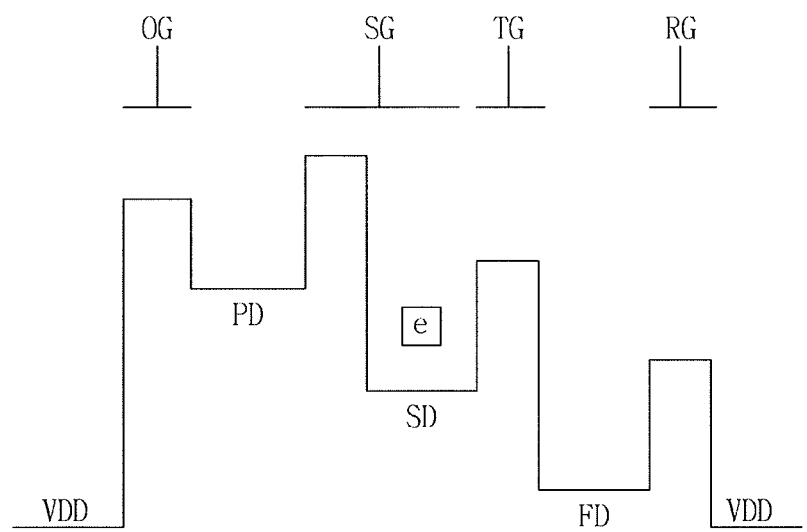
FIG. 10 illustrates energy bands for the pixel driving circuit.

FIG. 10 illustrates an example of energy bands corresponding to positions of the pixel driving circuit in FIG. 8. A charge generated from the photodiode PD region is transferred to the storage diode SD region in response to the storage control signal SG. A charge in the storage diode SD region is transferred to the floating diffusion node FD in response to the transfer control signal TG. The charge generated from the photodiode PD region may be transferred by electrons.

Figure 11:
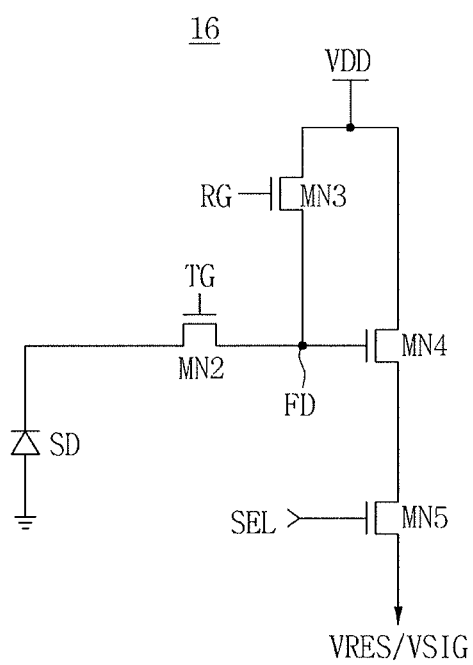
FIG. 11 illustrates an embodiment of a pixel driving circuit.

FIG. 11 illustrates another embodiment of a pixel driving circuit 16 for driving a unit pixel of a pixel array, which, for example, may form the OB sample array of the pixel array in the image sensor of FIG. 1.

Referring to FIG. 11, the pixel driving circuit 16 includes a storage diode SD, a first MOS transistor MN2, a second MOS transistor MN3, a third MOS transistor MN4, and a fourth MOS transistors MN5.

The storage diode SD has an anode connected to a reference (e.g., ground) voltage.

The first MOS transistor MN2 has a first output terminal connected to a cathode of the storage diode SD, a control terminal to receive the transfer control signal TG, and a second output terminal connected to a floating diffusion node FD.

The second MOS transistor MN3 has a first output terminal connected to the floating diffusion node FD, a second output terminal connected to a supply voltage VDD, and a control terminal to receive the reset control signal RG.

The third MOS transistor MN4 has a control terminal connected to the floating diffusion node FD, and a first output terminal connected to the supply voltage.

The fourth MOS transistor MN5 has a control terminal to receive the row selecting signal SEL, a first output terminal connected to a second output terminal of the third MOS transistor MN4, and a second output terminal from which the image signals are output. Because the OB sample array of a pixel array is fully shielded from light, the pixel driving circuit 16 may have a structure of FIG. 11 without the photodiode.

Figure 12:
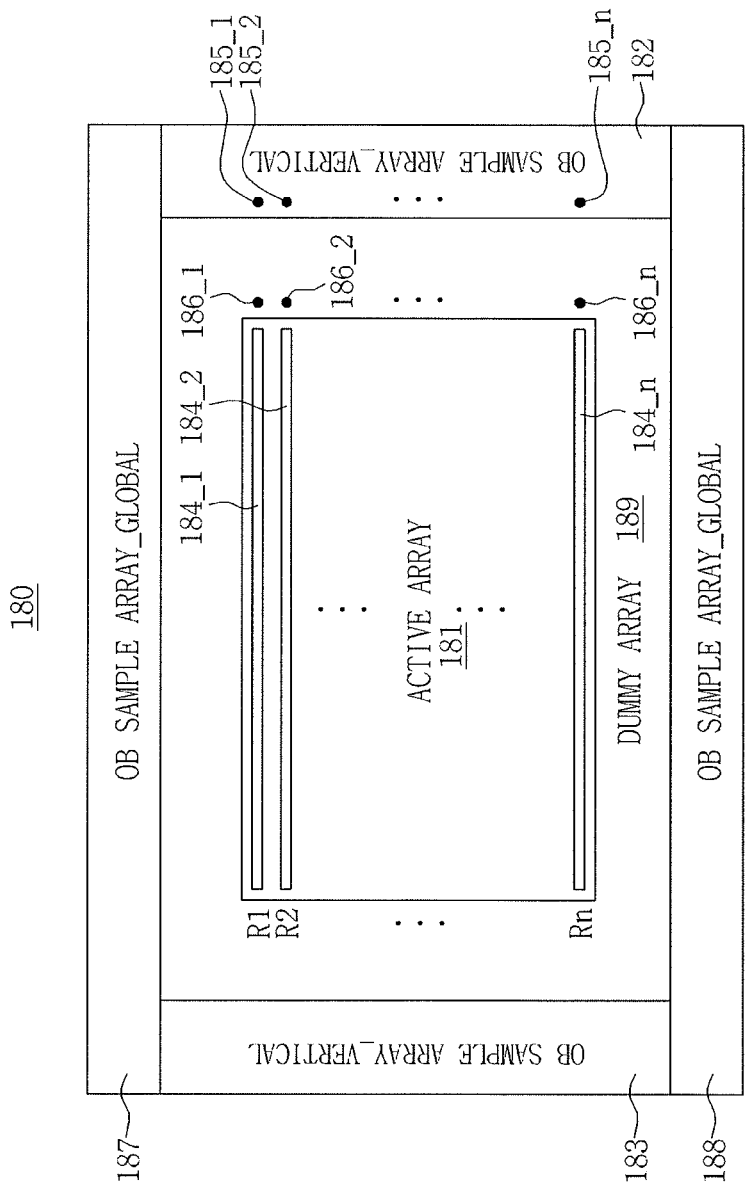
FIG. 12 illustrates another embodiment of a pixel array.

FIG. 12 illustrates an embodiment of a pixel array 180, which, for example, may be included in the image sensor 100 of FIG. 1. Referring to FIG. 12, the pixel array 180 may include an active array 181, a dummy array 189 that surrounds the active array 181, and OB sample arrays 183 and 182 adjacent to left and right sides of the dummy array 189, respectively. The pixel array 180 further includes OB sample arrays 187 and 188 adjacent to upper and lower sides of the active array 181, respectively.

The pixel array 180 may include rows R1 to Rn. The active array 181 may include rows 184_1 to 184_n. The OB sample array 182 adjacent to the right side of the active array 181 may include pixels 185_1 to 185_n. The OB sample array 183 adjacent to the left side of the active array 181 may include pixels.

The image sensor 100 may compare values of signals output from the active array 181 with values of signals output from the optical black sample arrays 182 and 183 to correct dark currents of the signals output from the active array 181. The image sensor may compare values of signals output from the active array 181 with values of signals output from the dummy array to correct light leakages of the signals output from the active array 181. Accordingly, the image sensor 100 may correct an offset of an image output signal caused by a dark current or light leakage. The light leakage may include leakage generated from the storage diode in the presence of light. In one or more of the embodiments described herein, correcting an offset may include reducing an error value or completely removing the error value in signals output from the active array.

Figure 13:
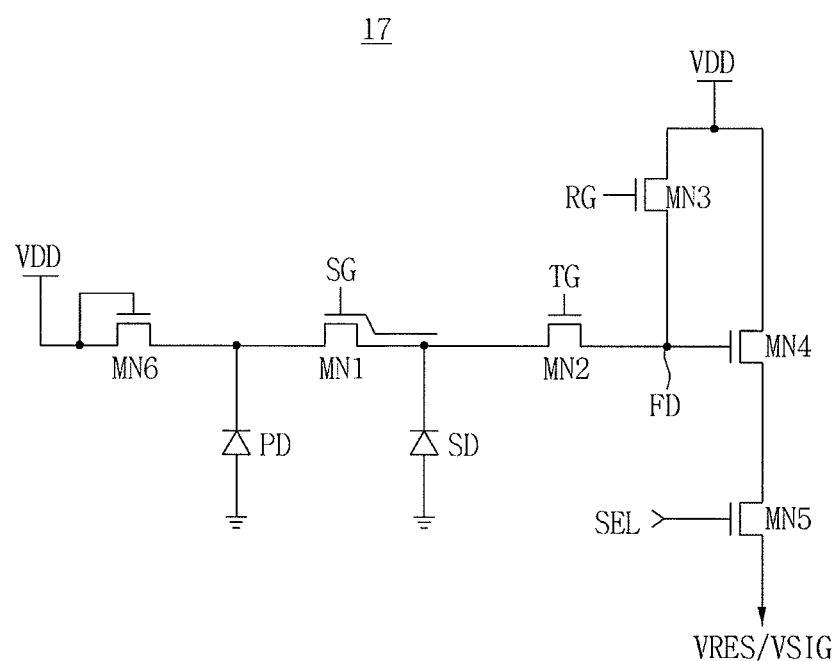
FIG. 13 illustrates an embodiment of a pixel driving circuit.

FIG. 13 illustrates another embodiment of a pixel driving circuit 17 for driving a unit pixel of a pixel array forming the dummy array 189 in the image sensor 100 of FIG. 1. Referring to FIG. 13, the pixel driving circuit 17 may include a photodiode PD, a first MOS transistor MN1, a storage diode SD, a second MOS transistor MN2, a third MOS transistor MN3, a fourth MOS transistor MN4, a fifth MOS transistor MN5, and a sixth MOS transistor MN6.

The photodiode PD has an anode connected to a reference (e.g., ground) voltage.

The first MOS transistor MN1 has a first output terminal connected to a cathode of the photodiode PD, and a control terminal to receive the storage control signal SG.

The storage diode SD has a cathode connected to a second output terminal of the first MOS transistor, and an anode connected to the reference (e.g., ground) voltage.

The second MOS transistor MN2 has a first output terminal connected to the second output terminal of the first MOS transistor, a control terminal to receive the transfer control signal TG, and a second output terminal connected to a floating diffusion node FD.

The third MOS transistor MN3 has a first output terminal connected to the floating diffusion node FD, a second output terminal connected to a supply voltage VDD, and a control terminal to receive the reset control signal RG.

The fourth MOS transistor MN4 has a control terminal connected to the floating diffusion node FD, and a first output terminal connected to the supply voltage VDD.

The fifth MOS transistor MN5 has a control terminal to receive the row selecting signal SEL, a first output terminal connected to a second output terminal of the fourth MOS transistor MN4, and a second output terminal from which the image signals are output.

The sixth MOS transistor MN6 has a first output terminal connected to a cathode of the photodiode, a control terminal, and a second output terminal connected in common to the supply voltage VDD.

Because the sixth MOS transistor MN6 is connected in diode form, and the gate and the drain are connected to the supply voltage VDD, the pixel driving circuit 17 of FIG. 13 serves to discharge charge generated from the cathode of the photodiode PD. Therefore, the pixel driving circuit 17 may be used in the dummy array 189 of the pixel array.

Figure 14:
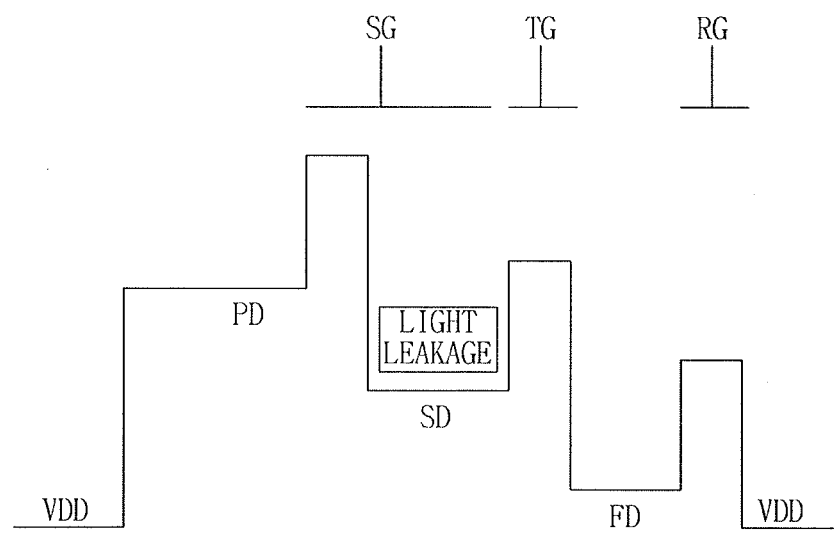
FIG. 14 illustrates energy bands for the pixel driving circuit in FIG. 13.

FIG. 14 illustrates energy bands of the pixel driving circuit 17 in FIG. 13. Referring to FIG. 14, charge is not generated from the photodiode PD, and only charge generated by a light leakage may be accumulated in the storage diode SD.

Figure 15:
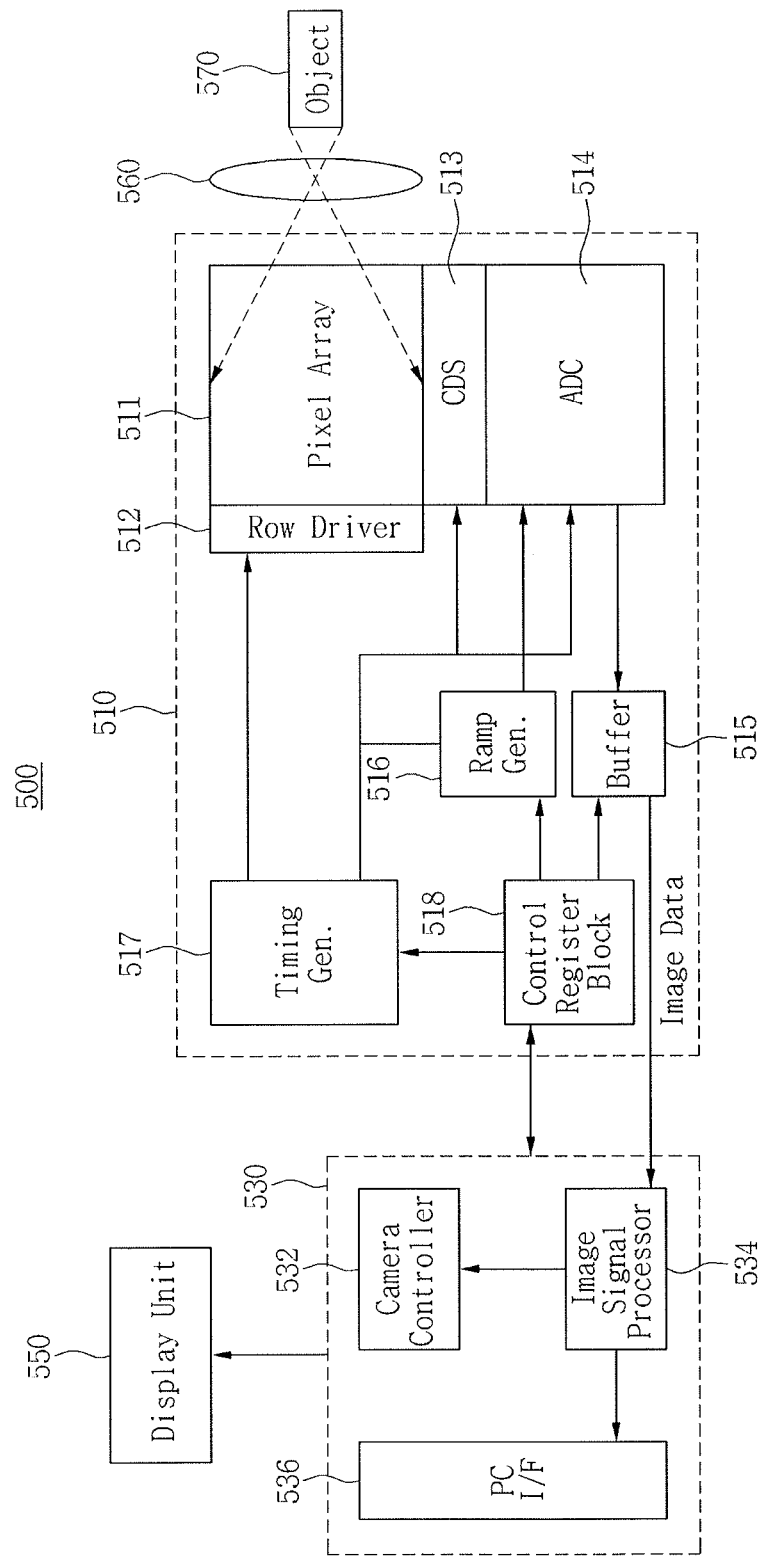
FIG. 15 illustrates an embodiment of an image processing device.

FIG. 15 illustrates an embodiment of an image processing device 500 which includes the image sensor 100 of FIG. 1. Referring to FIG. 15, the image processing device 500 may include an image sensor 510, an image processor 530, a display unit 550, and an optical lens 560. The image processing device 500 may also include a digital camera and a data processing device that includes the digital camera. The data processing device may be, for example, a personal computer, a mobile phone, a smart phone, a tablet PC, or an information technology device. The digital camera may be, for example, a digital single-lens reflex (DSLR) camera.

The image sensor 510 converts an optical image of an object, which is input through the optical lens 560 under control of the image processor 510, to an electrical image signal.

The image sensor 510 may include a control register block 518 which generates control signals to control operations of a ramp generator 516, a timing generator 517, and a buffer 515. Operation of the control register block 518 may be controlled by a camera controller 532.

The image processor 530 controls operation of the image sensor 510, processes image data output from the image sensor 510, and transfers the processed data to the display unit 550 to display the processed data. Image data may be generated according to an output signal of the buffer 515. The display unit 550 may include a plurality of devices for outputting image signals. For example, the display unit 550 may include or be included in a computer, a mobile phone, and other image output terminals.

The image processor 530 may include the camera controller 532, an image signal processor 534, and a PC interface (I/F) 536. The camera controller 532 controls the control register block 518. The image signal processor 534 processes image data output from the buffer 515, and outputs the processed data to the display unit 550 through the PC I/F 536.

Figure 16:
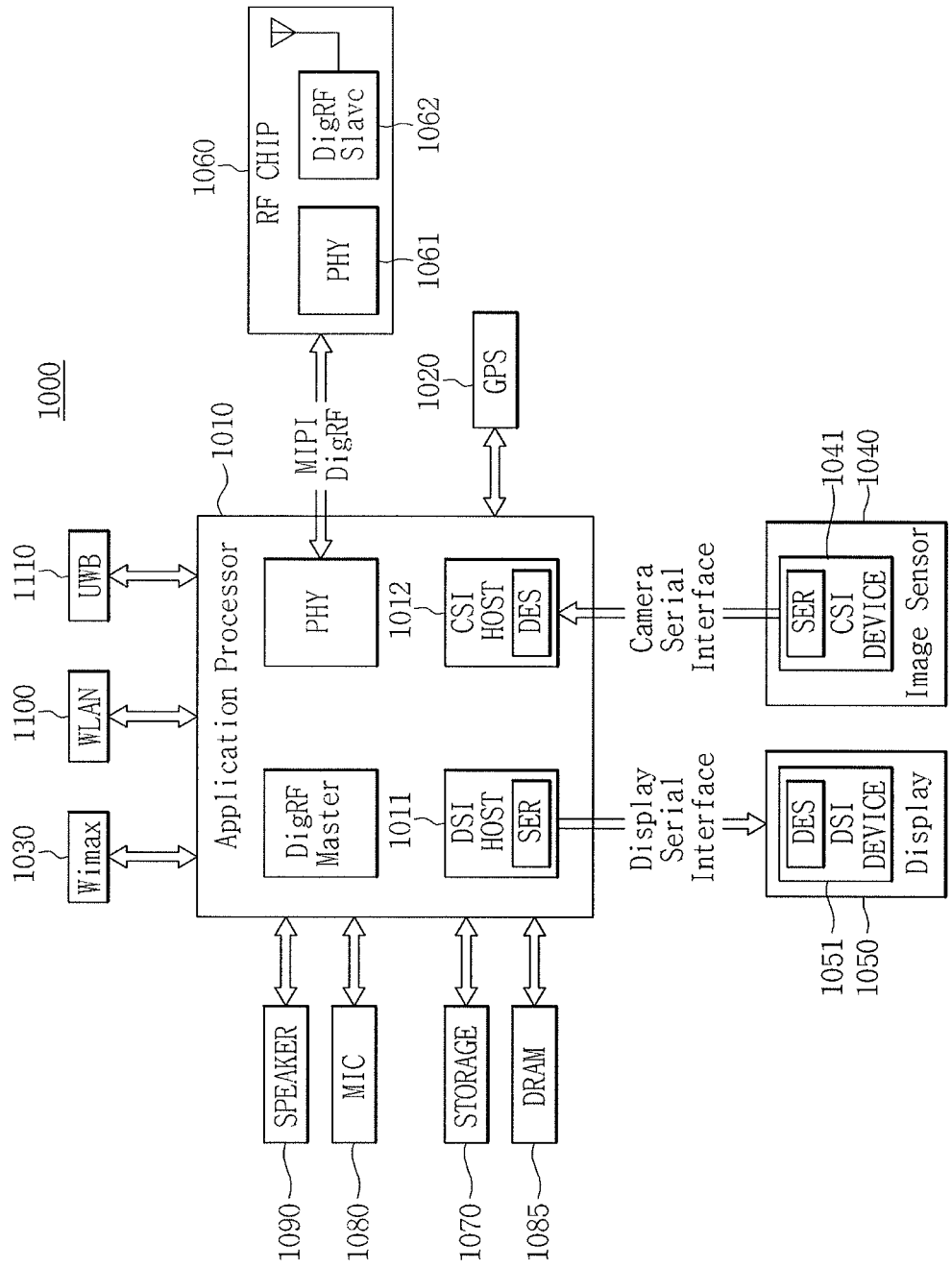
FIG. 16 illustrates an embodiment of an electronic system.

FIG. 16 illustrates an embodiment of an electronic system 1000 which may include the image sensor 100 of FIG. 1. Referring to FIG. 16, the electronic system 1000 may be implemented as a data processing device that uses or supports a mobile industry processor interface (MIPI), e.g., a mobile phone, a personal digital assistant (PDA), a portable multimedia player (PMP), or a smart phone.

The electronic system 1000 may include an application processor 1010, an image sensor 1040, and a display 1050. A CSI HOST 1012 implemented in the application processor 1010 may perform a serial communication with a CSI device 1041 of the image sensor 1040 through a camera serial interface (CSI). The CSI HOST 1012 may include an optical serializer, and the CSI device 1041 may include an optical deserializer.

The electronic system 1000 may further include an RF chip 1060 that communicates with the application processor 1010. A physical layer PHY 1061 of the electronic system 1000 and a physical layer PHY of the application processor 1010 may receive or transmit data according to MIPI DigRF.

The electronic system 1000 may further include a global positioning system (GPS) 1020, a storage 1070, a microphone (MIC) 1080, DRAM 1085, and a speaker 1090. The electronic system 1000 may further include WiMAX (Wordwide Interoperability for Microwave access) 1030, WLAN (wireless LAN) 1100, and UWB (ultra wideband) 1110.

Figure 17:
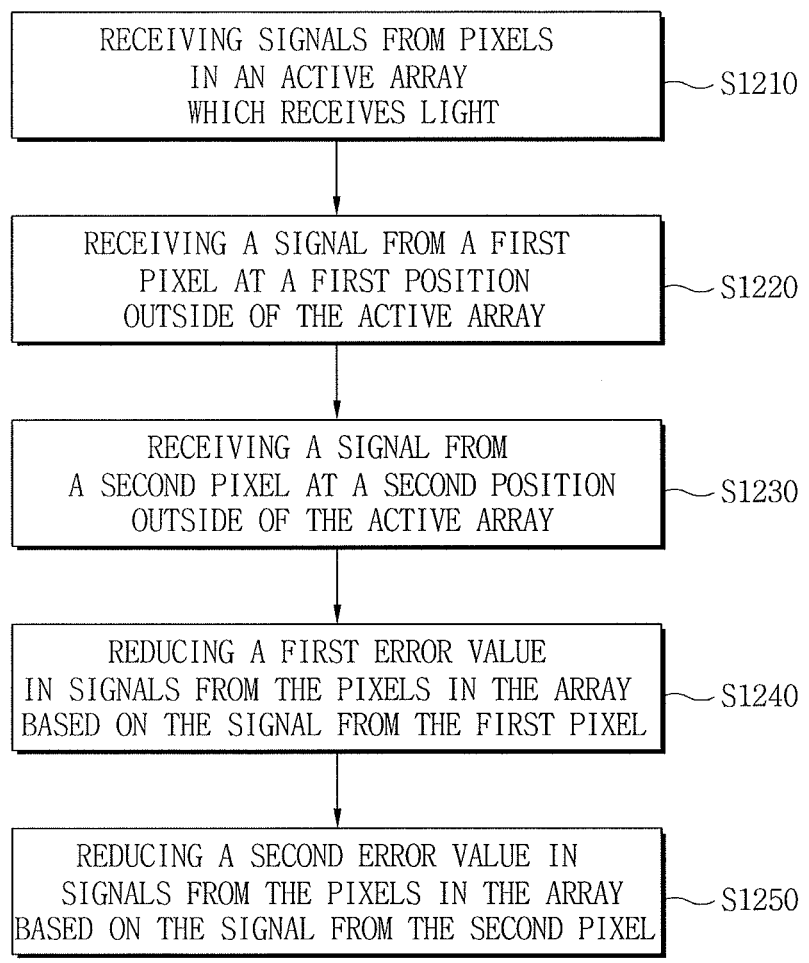
FIG. 17 illustrates another embodiment of a method for correcting output signals of an image sensor.

FIG. 17 shows operations included in another embodiment of a method for correcting signals output from a pixel array. The pixel array may correspond, for example, to any of the aforementioned embodiments of the pixel array with respect to some or all of the operations in the method. For illustrative purposes only, the method will be described in association with the pixel array 180 in FIG. 12.

The method includes receiving signals from pixels in the active array 181 which receives light from an object for which an image is to be generated (S1210), receiving a signal output from a first pixel at a first position outside of the active array 181 (S1220), and receiving a signal output from a second pixel at a second position outside of the active array (S1230). The first pixel may be, for example, a pixel in one of the dummy array 189 or the OB sample array 182 or 183, and the second pixel may be, for example, a pixel in the other of the dummy array 189 or the OB sample array 182 or 183.

The method may further include reducing a first error value in signals from the pixels in the active array 181 based on the signal from the first pixel (S1240), and reducing a second error value in signals from the pixels in the active array 181 based on the signal from the second pixel (S1250). The first error value may be, for example, a storage diode leakage value, and the second error value may be, for example, a dark current value, or vice versa.

This method and the other methods and processes described herein may be performed by code or instructions to be executed by a computer, processor, or controller of the image sensor or a host device which includes the image sensor. Because the algorithms that form the basis of the method embodiments are described in detail, the code or instructions for implementing the operations of the method embodiments may transform the computer, processor, or controller into a special-purpose processor for performing the methods described herein.

Also, another embodiment may include a non-transitory computer-readable medium for storing the code or instructions described above. The computer-readable medium may be a volatile or non-volatile memory or other storage device, which may be removably or fixedly coupled to the computer, processor, or controller which is to execute the code or instructions for performing the method embodiments described herein.

In accordance with one or more of the aforementioned embodiments, an image sensor includes an OB sample array adjacent to an active array. The image sensor may correct output signals of the array by comparing values of signals output from the pixels of the rows having optical (e.g., light) signals with values of signals output from the pixels of the rows not having optical signals. Therefore, the image sensor may reduce a dark current in the output signals of the image sensor using signals output from the OB sample array.

In accordance with one or more embodiments, an image sensor may include an active array, a dummy array that surrounds the active array, and an OB sample array adjacent to the dummy array. The image sensor may compares values of signals output from the active array among first signals with values of signals output from the OB sample array, to correct dark currents of the signals output from the active array The image sensor may compare the values of signals output from the active array among the first signals with values of signals output from the dummy array, to correct light leakages of the signals output from the active array.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An image sensor, comprising:
   a row driver configured to generate a storage control signal, a transfer control signal, a reset control signal, and a row selecting signal;
   a pixel array including an optical black sample array adjacent to an active array, the pixel array configured to receive optical signals and convert the optical signals to electric signals and configured to output the electric signals as image signals in response to the storage control signal, the transfer control signal, the reset control signal, and the row selecting signal;
   an analog-to-digital converter configured to perform an analog-to-digital conversion on the image signals to generate first signals; and
   an output correcting circuit configured to compare values of signals output from the active array with values of signals output from the optical black sample array, and configured to correct the signals output from the active array to generate second signals based on the comparison.

2. The image sensor as claimed in claim 1, wherein the optical black sample array is configured to be fully shielded from light.

3. The image sensor as claimed in claim 1, wherein:
   the signals output from the active array among the first signals include signal components corresponding to optical signals and storage-diode leakage current components, and
   the signals output from the optical black sample array include the storage-diode leakage current components without optical signal components.

4. The image sensor as claimed in claim 1, wherein the output correcting circuit is configured to compare the values of signals output from the active array with the values of signals output from the optical black sample array, and to correct the signals output from the active array to reduce vertical shading.

5. The image sensor as claimed in claim 1, wherein the output correcting circuit is configured to subtract the values of signals output from the active array among the first signals from the values of signals output from the optical black sample array, to reduce a vertical shading of signals output from the active array.

6. The image sensor as claimed in claim 1, wherein the output correcting circuit is configured to compare values of signals output from rows of the active array with values of signals output from corresponding rows of the optical black sample array, to correct the signals output from the active array.

7. The image sensor as claimed in claim 1, wherein the optical black sample array is adjacent to a first side or a second side of the active cell array.

8. The image sensor as claimed in claim 1, wherein the optical black sample arrays are adjacent to a first side and a second side of the active cell array, respectively.

9. The image sensor as claimed in claim 8, wherein:
   signals output from a first portion of the active array is configured to be corrected by signals output from the one of the optical black sample arrays, and
   signals output from a second portion of the active array is configured to be corrected by signals output from the another one of the optical black sample arrays.

10. The image sensor as claimed in claim 1, further comprising:
    a buffer circuit configured to latch and amplify the second signals, to generate output signals.

11. An image sensor, comprising:
    a row driver configured to generate a storage control signal, a transfer control signal, a reset control signal, and a row selecting signal;
    a pixel array including an active array, a dummy array adjacent to the active array, and an optical black sample array adjacent to the dummy array, the pixel array configured to receive optical signals and convert the optical signals to electrical signals for output as image signals in response to the storage control signal, the transfer control signal, the reset control signal, and the row selecting signal;
    an analog-to-digital converter configured to perform an analog-to-digital conversion on the image signals to generate first signals; and
    an output correcting circuit configured to compare values of signals output from the active array among the first signals with values of signals output from the optical black sample array to correct dark currents of the signals output from the active array, to compare the values of signals output from the active array among the first signals with values of signals output from the dummy array to correct light leakages of the signals output from the active array, and to generate second signals.

12. The image sensor as claimed in claim 11, wherein each of the pixels in the active array and the optical black sample array includes:
    a photodiode having an anode connected to a reference voltage;
    a first MOS transistor having a first output terminal connected to a cathode of the photodiode, and a control terminal to receive the storage control signal;
    a storage diode having a cathode connected to a second output terminal of the first MOS transistor and an anode connected to the reference voltage;
    a second MOS transistor having a first output terminal connected to the second output terminal of the first MOS transistor, a control terminal to receive the transfer control signal, and a second output terminal connected to a floating diffusion node;
    a third MOS transistor having a first output terminal connected to the floating diffusion node, a second output terminal connected to a supply voltage, and a control terminal to receive the reset control signal;
    a fourth MOS transistor having a control terminal connected to the floating diffusion node and a first output terminal connected to the supply voltage;
    a fifth MOS transistor having a control terminal to receive the row selecting signal, a first output terminal connected to a second output terminal of the fourth MOS transistor, and a second output terminal from which the image signals are output; and a sixth MOS transistor having a first output terminal connected to a cathode of the photodiode, a second output terminal connected to the supply voltage, and a control terminal to receive an overflow control signal.

13. The image sensor as claimed in claim 11, wherein each of the pixels included in the optical black sample array includes:
 a storage diode having an anode connected to a reference voltage;
 a first MOS transistor having a first output terminal connected to a cathode of the storage diode, a control terminal to receive the transfer control signal, and a second output terminal connected to a floating diffusion node;
 a second MOS transistor having a first output terminal connected to the floating diffusion node, a second output terminal connected to a supply voltage, and a control terminal to receive the reset control signal;
 a third MOS transistor having a control terminal connected to the floating diffusion node and a first output terminal connected to the supply voltage; and
 a fourth MOS transistor having a control terminal to receive the row selecting signal, a first output terminal connected to a second output terminal of the third MOS transistor, and a second output terminal from which the image signals are output.

14. The image sensor as claimed in claim 11, wherein each of the pixels included in the dummy array includes:
 a photodiode having an anode connected to a reference voltage;
 a first MOS transistor having a first output terminal connected to a cathode of the photodiode and a control terminal to receive the storage control signal;
 a storage diode having a cathode connected to a second output terminal of the first MOS transistor and an anode connected to the reference voltage;
 a second MOS transistor having a first output terminal connected to the second output terminal of the first MOS transistor, a control terminal to receive the transfer control signal, and a second output terminal connected to a floating diffusion node;
 a third MOS transistor having a first output terminal connected to the floating diffusion node, a second output terminal connected to a supply voltage, and a control terminal to receive the reset control signal;
 a fourth MOS transistor having a control terminal connected to the floating diffusion node and a first output terminal connected to the supply voltage;
 a fifth MOS transistor having a control terminal to receive the row selecting signal, a first output terminal connected to a second output terminal of the fourth MOS transistor, and a second output terminal from which the image signals are output; and
 a sixth MOS transistor having a first output terminal connected to a cathode of the photodiode, a control terminal, and a second output terminal commonly connected to the supply voltage.

15. The image sensor as claimed in claim 14, wherein the sixth MOS transistor is configured to discharge charges generated at the cathode of the photodiode.

* * * * *